(12) United States Patent
Post et al.

(10) Patent No.: US 11,351,733 B2
(45) Date of Patent: Jun. 7, 2022

(54) ADDITIVE MANUFACTURING

(71) Applicant: HEWLETT-PACKARD DEVELOPMENT COMPANY, L.P., Houston, TX (US)

(72) Inventors: Alvin Post, Vancouver, WA (US); Arthur H. Barnes, Vancouver, WA (US); Sheldon Bernard, Vancouver, WA (US); Matthew A. Shepherd, Vancouver, WA (US); Todd Goyen, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 853 days.

(21) Appl. No.: 16/075,172

(22) PCT Filed: Apr. 8, 2017

(86) PCT No.: PCT/US2017/026731
§ 371 (c)(1),
(2) Date: Aug. 3, 2018

(87) PCT Pub. No.: WO2018/186893
PCT Pub. Date: Oct. 11, 2018

(65) Prior Publication Data
US 2021/0206108 A1    Jul. 8, 2021

(51) Int. Cl.
*B29C 64/393* (2017.01)
*B33Y 30/00* (2015.01)
(Continued)

(52) U.S. Cl.
CPC .......... *B29C 64/393* (2017.08); *B29C 64/165* (2017.08); *B29C 64/295* (2017.08); *B33Y 30/00* (2014.12); *B33Y 50/02* (2014.12)

(58) Field of Classification Search
CPC .... B29C 64/112; B29C 64/165; B29C 64/393
See application file for complete search history.

(56) References Cited

U.S. PATENT DOCUMENTS

| 5,040,075 A | 8/1991 | Takayanagi |
|---|---|---|
| 6,178,299 B1 | 1/2001 | Kim |

(Continued)

FOREIGN PATENT DOCUMENTS

| CN | 110325347 | 10/2019 |
|---|---|---|
| EP | 2572865 A1 | 3/2013 |

(Continued)

OTHER PUBLICATIONS

Guan et al., "Loose Powder Detection and Surface Characterization in Selective Laser Sintering via Optical Coherence Tomography", Retrieved from Internet: https://www.ncbi.nlm.nih.gov/pmc/articles/PMC4971245/, Jul. 2016, 9 pages.

*Primary Examiner* — Matthew J Daniels
*Assistant Examiner* — Andrew L Swanson
(74) *Attorney, Agent, or Firm* — HP Inc. Patent Department

(57) ABSTRACT

In one example, a fusing system for an additive manufacturing machine includes a fusing lamp to heat build material in the work area, a heat sensor to measure a heat output of the fusing lamp, and a controller operatively connected to the fusing lamp and to the heat sensor to adjust the heat output of the fusing lamp to the work area based on a heat output measured by the heat sensor.

11 Claims, 15 Drawing Sheets

(51) Int. Cl.
*B33Y 50/02* (2015.01)
*B29C 64/295* (2017.01)
*B29C 64/165* (2017.01)

(56) References Cited

U.S. PATENT DOCUMENTS

| | | |
|---|---|---|
| 9,095,874 B2 | 8/2015 | Schroder et al. |
| 9,242,411 B2 | 1/2016 | Kritchman et al. |
| 2003/0209836 A1 | 11/2003 | Sherwood |
| 2005/0168509 A1 | 8/2005 | Yokoyama |
| 2008/0169589 A1* | 7/2008 | Sperry ............... B29C 64/35 264/494 |
| 2010/0173096 A1* | 7/2010 | Kritchman ............ B29C 64/112 427/553 |
| 2017/0173871 A1 | 6/2017 | Desimone et al. |

FOREIGN PATENT DOCUMENTS

| | | | |
|---|---|---|---|
| EP | 3094470 | 11/2016 | |
| WO | 2015106832 A1 | 7/2015 | |
| WO | WO-2015108547 A2 * | 7/2015 | ........... B29C 64/393 |
| WO | WO-2015167520 A1 * | 11/2015 | ........... B29C 64/386 |
| WO | 2017054842 A1 | 4/2017 | |

* cited by examiner

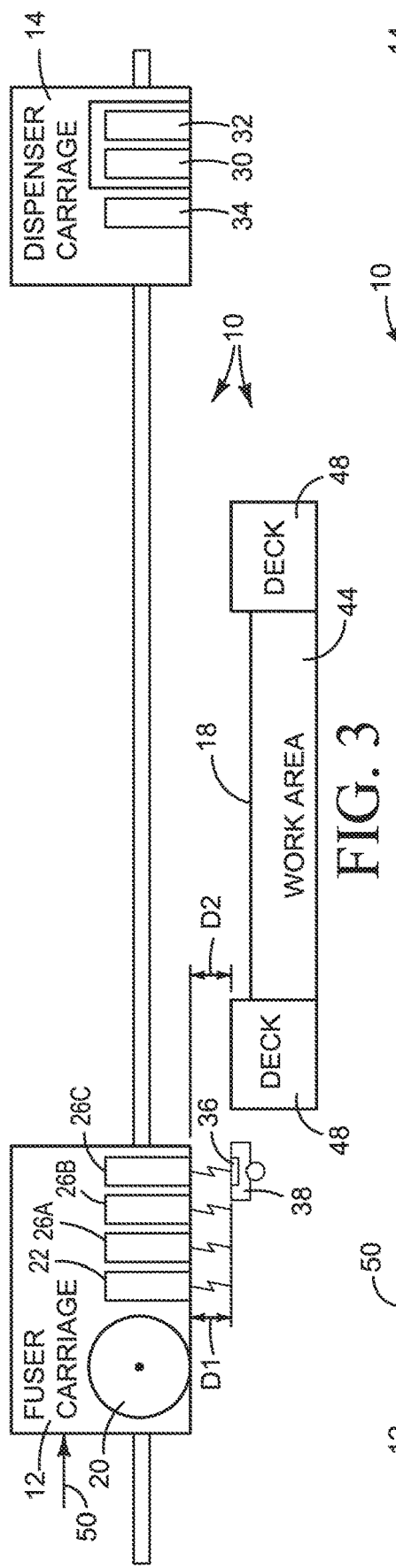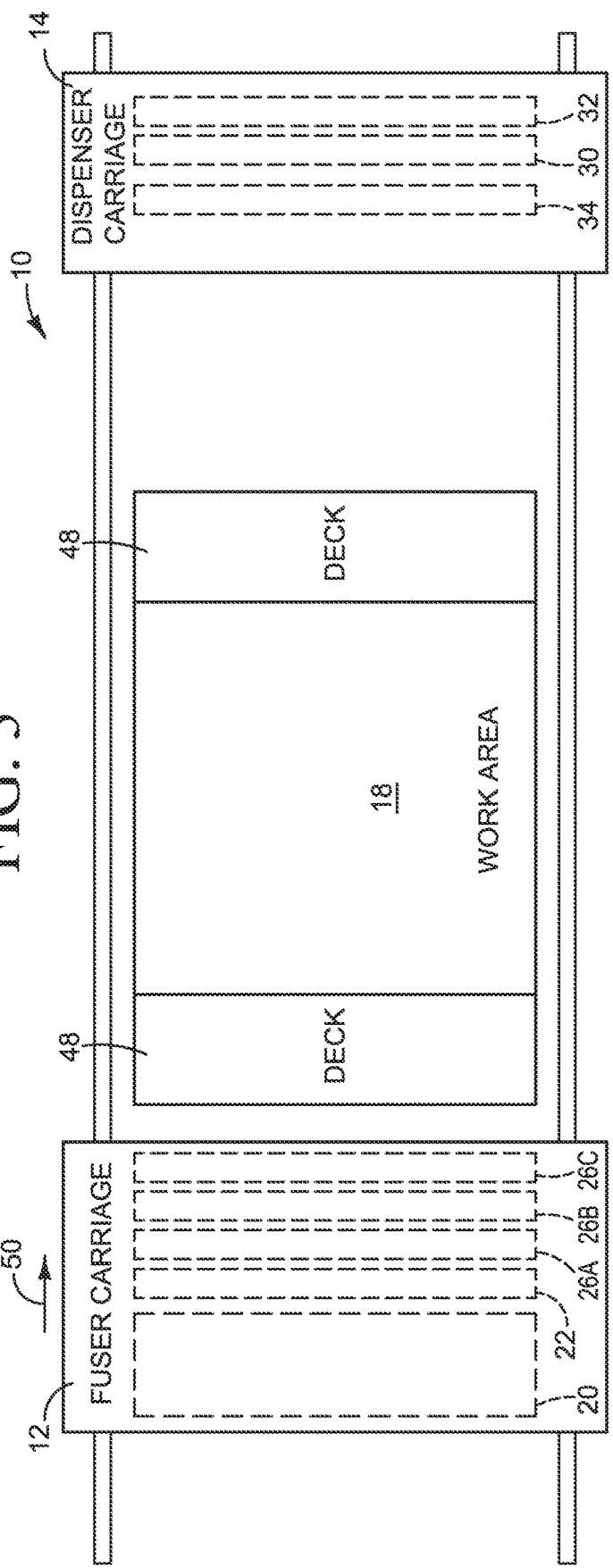

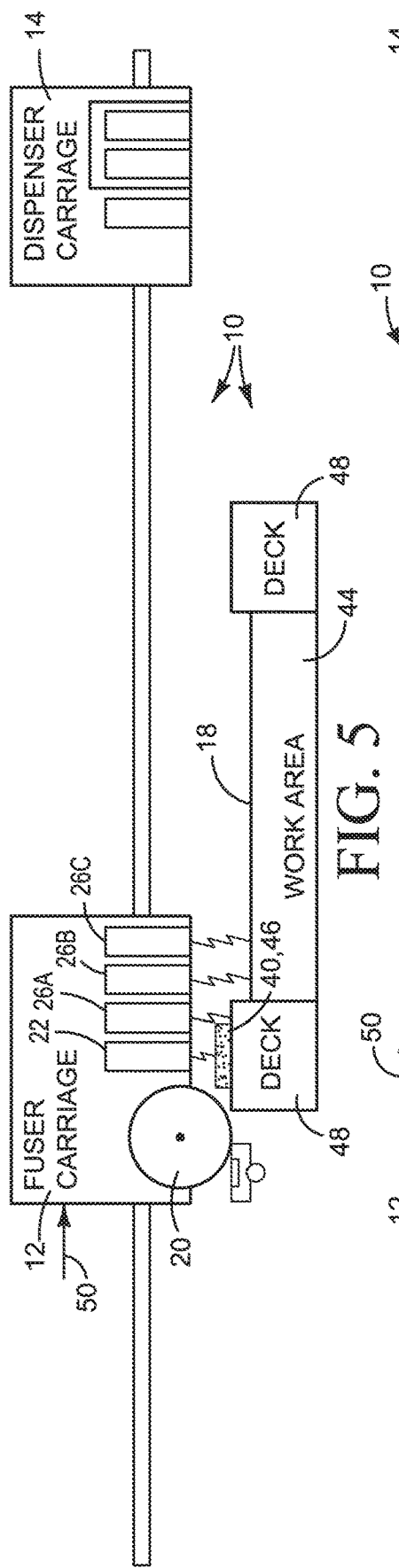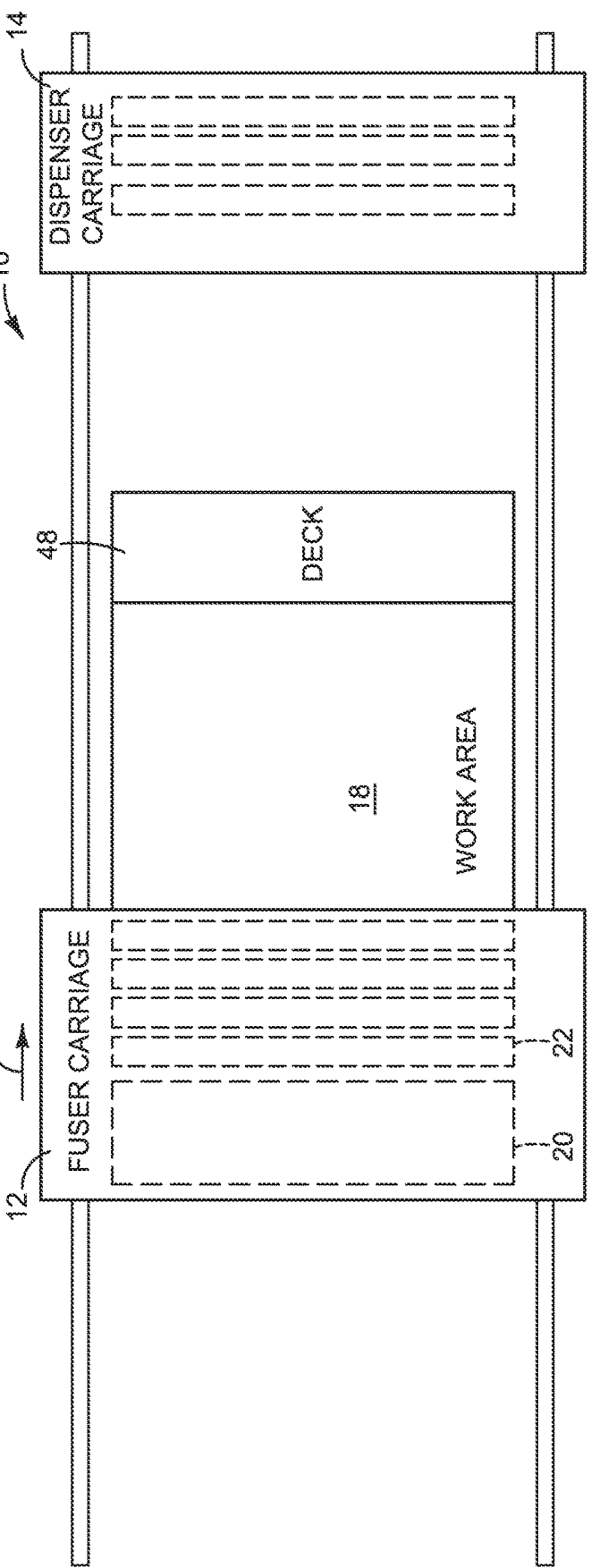

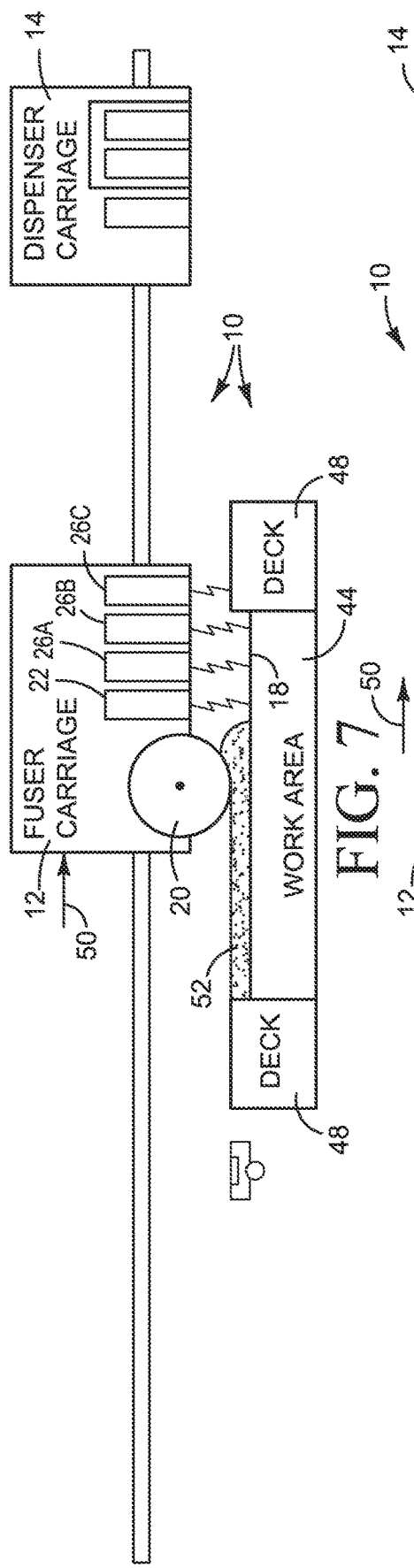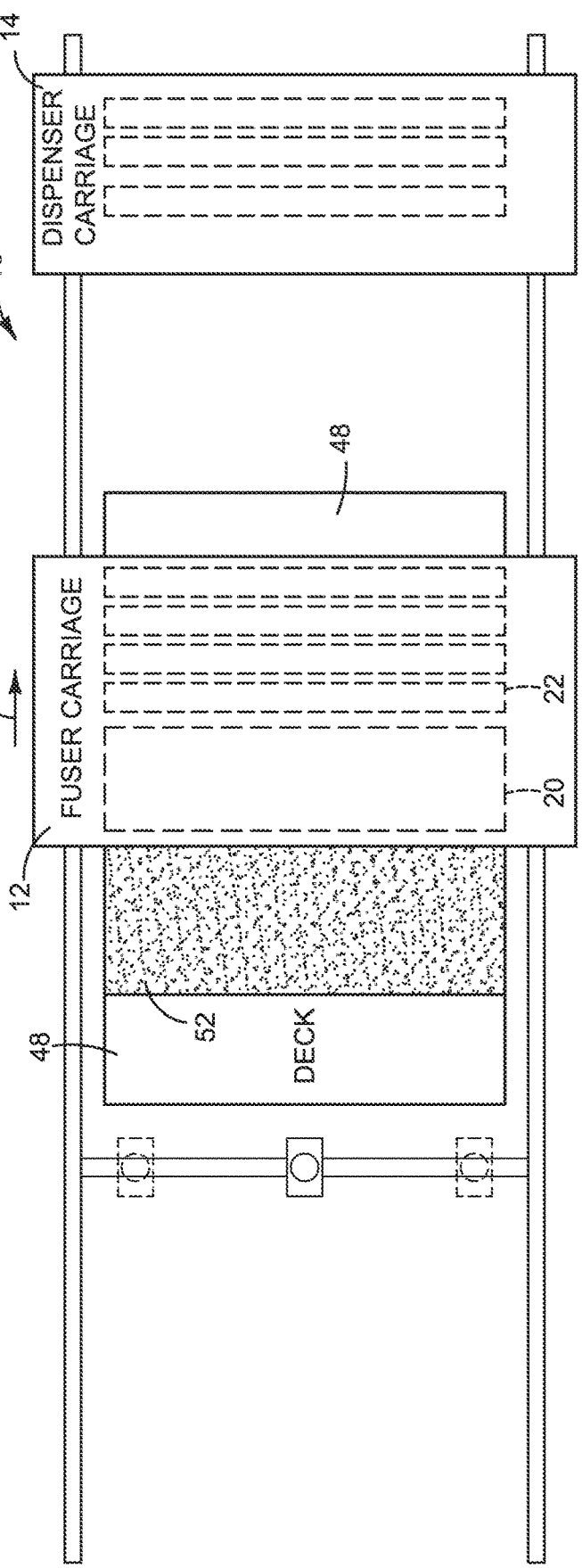

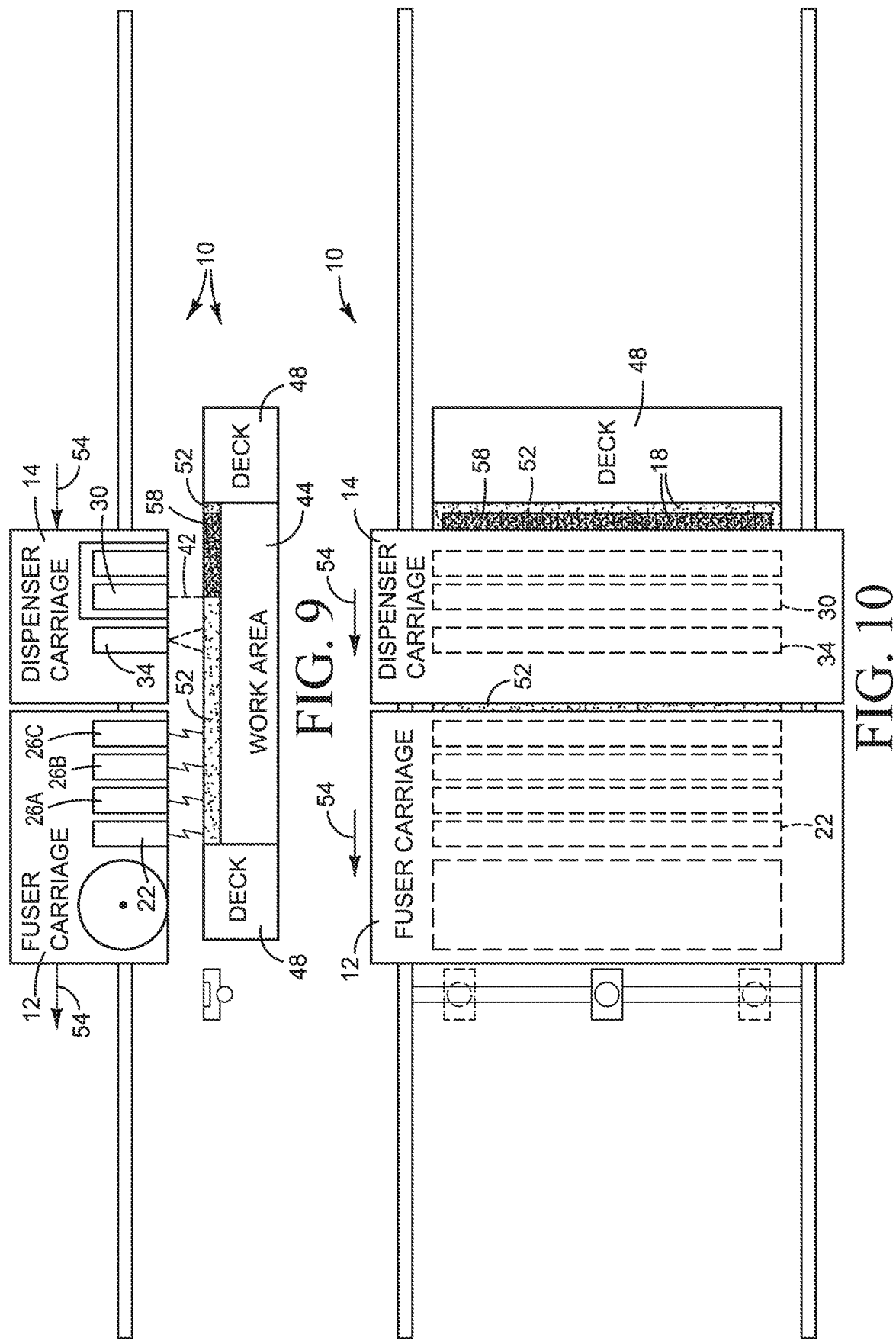

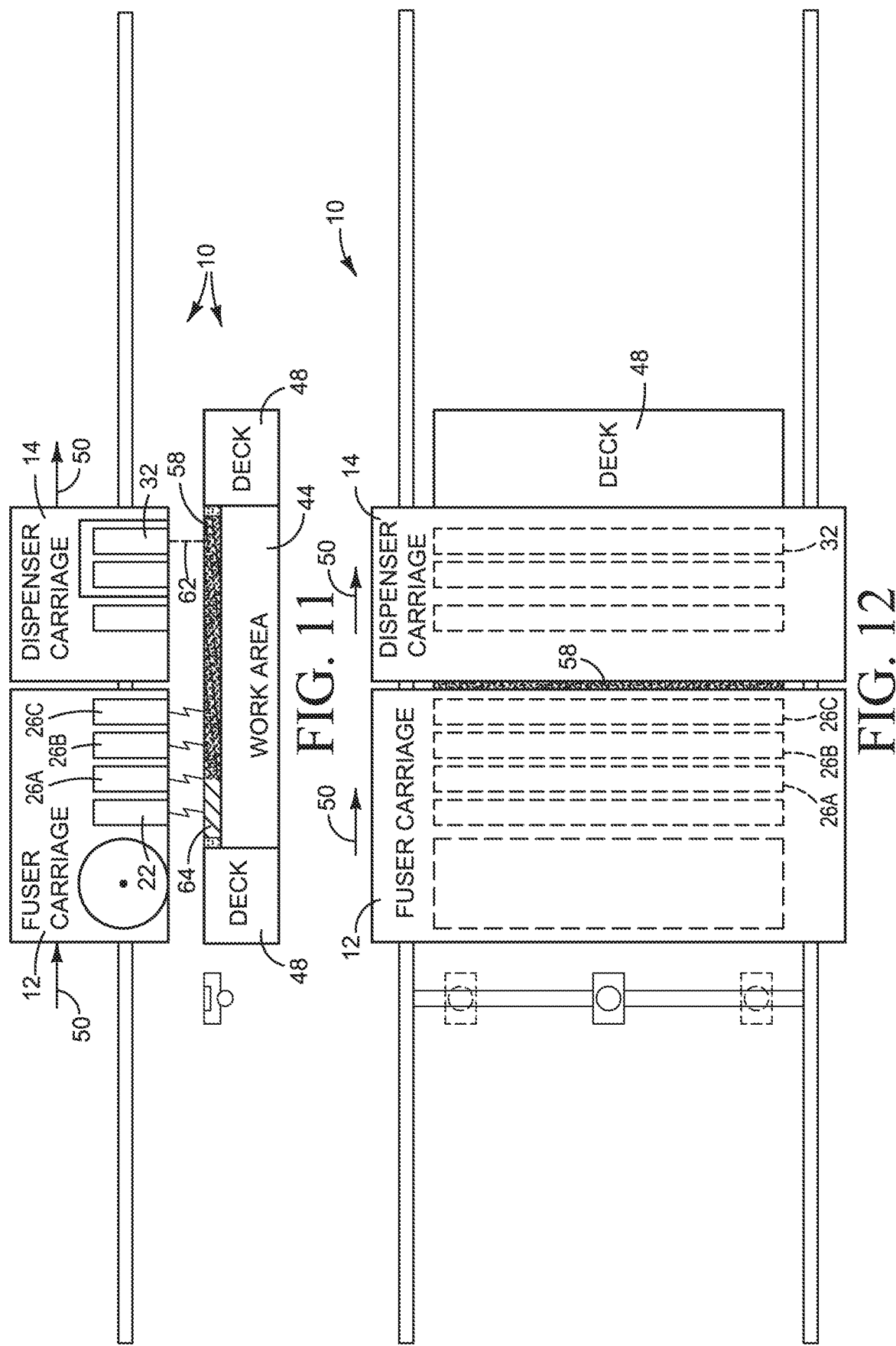

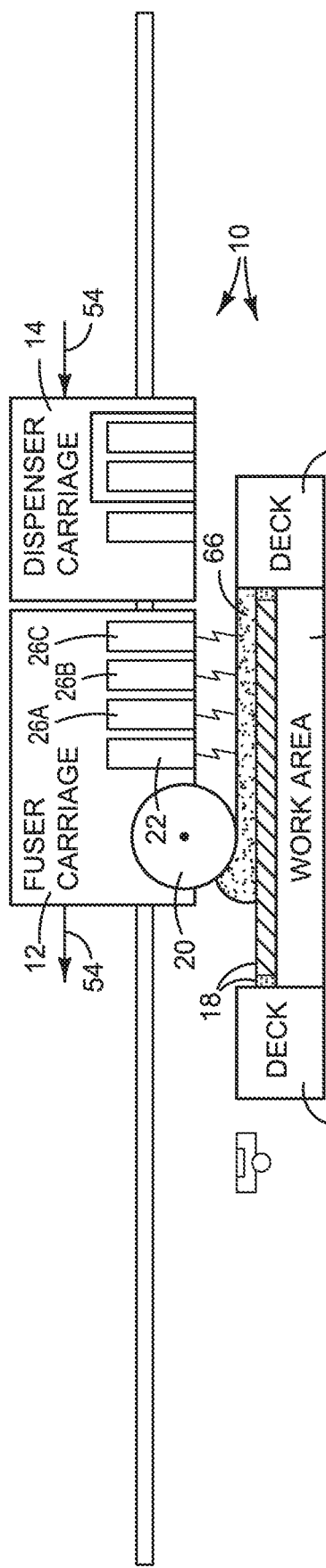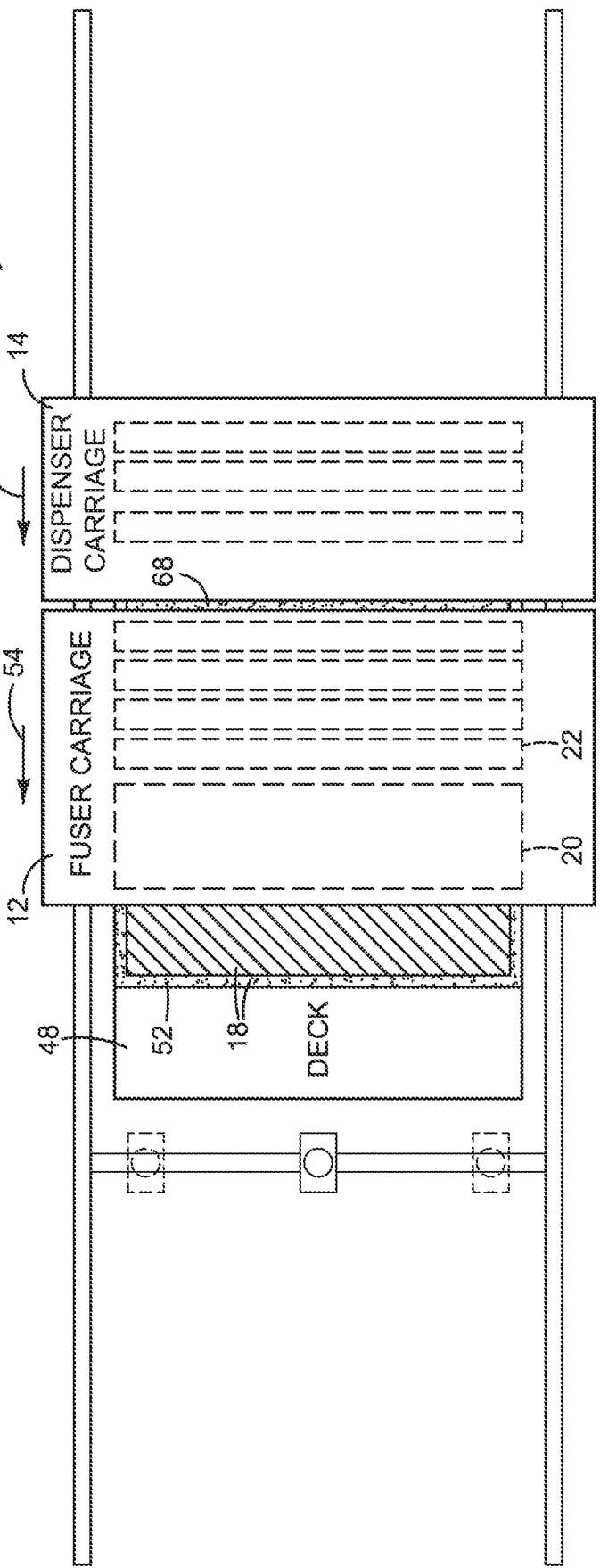

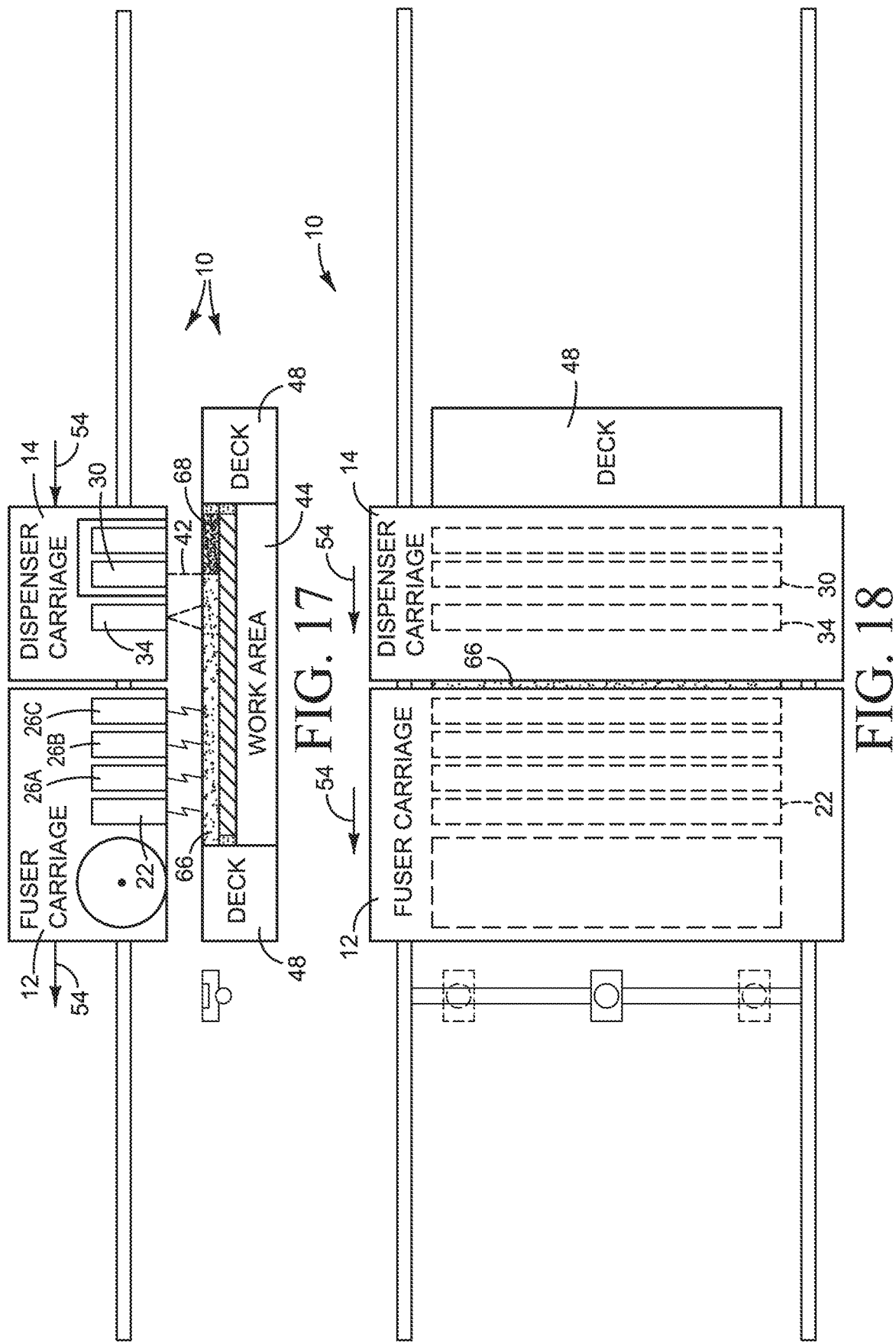

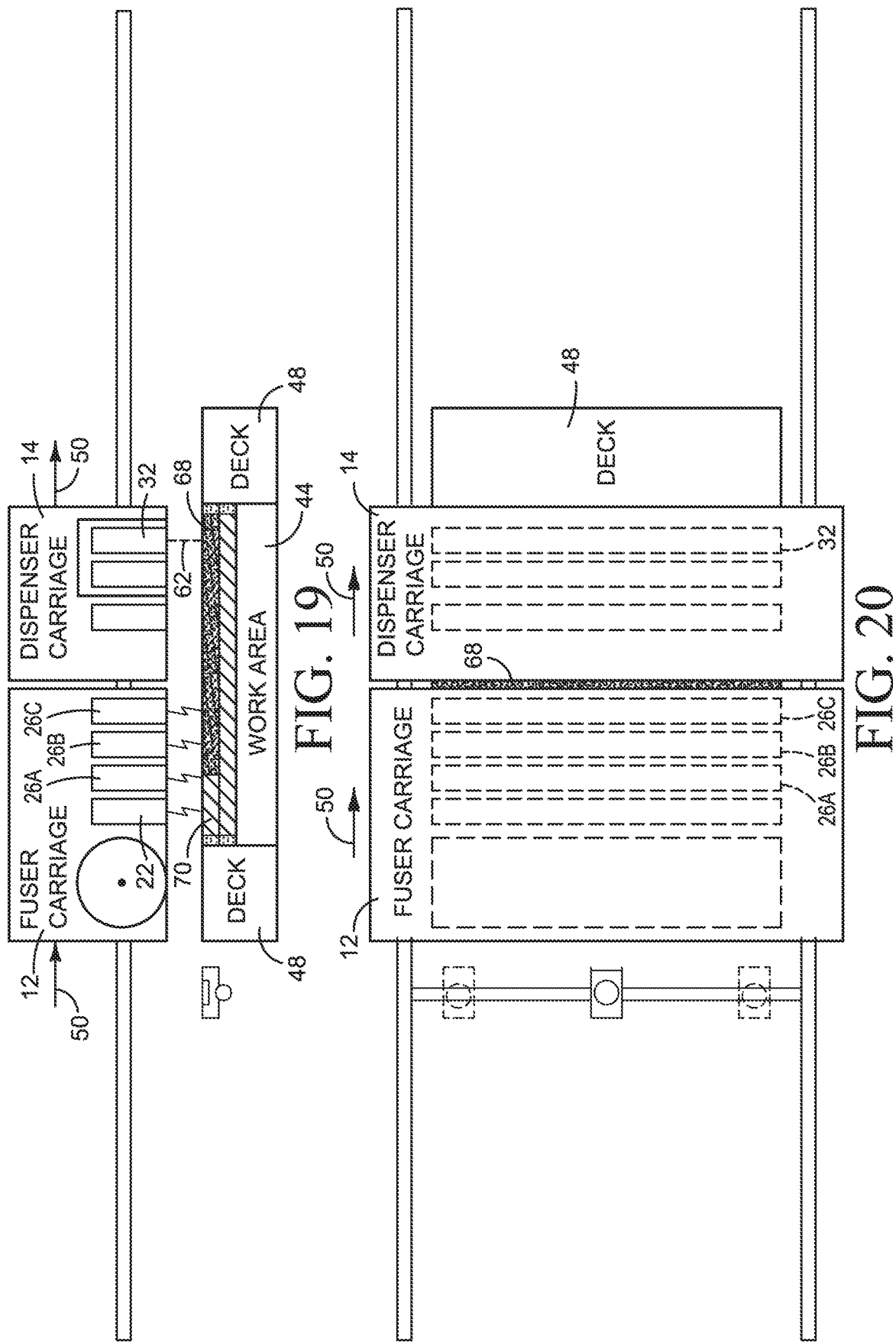

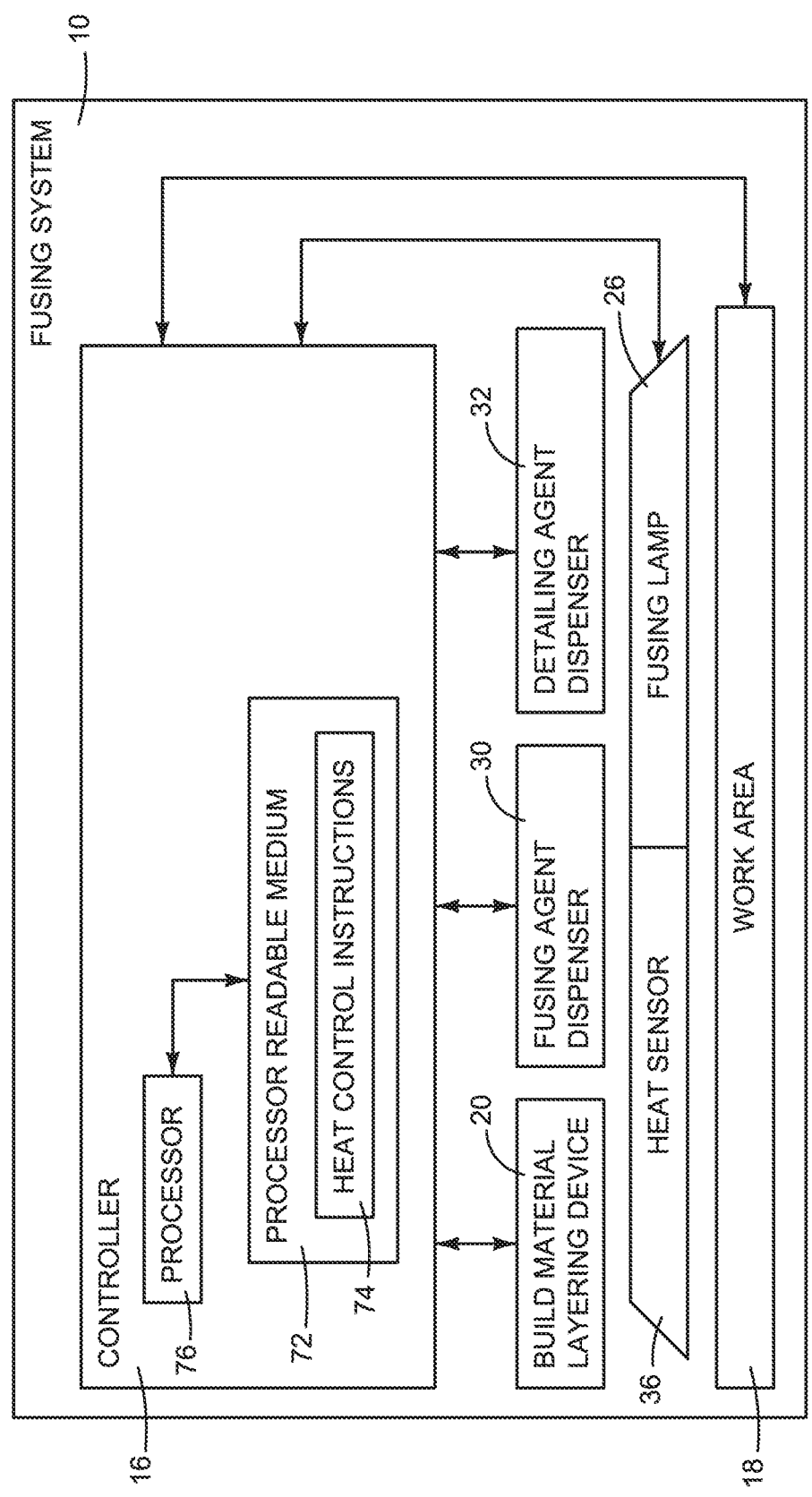

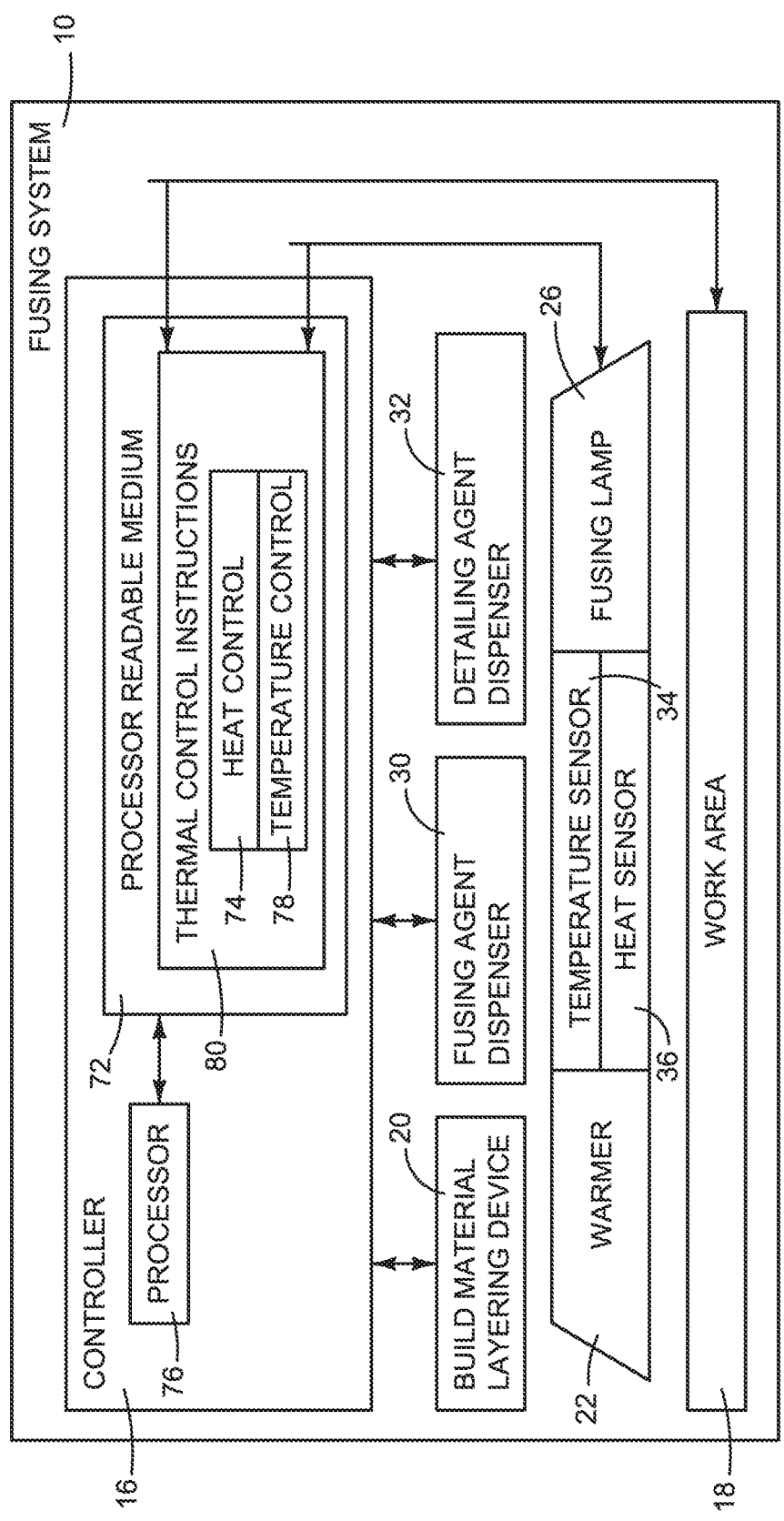

ADDITIVE MANUFACTURING

BACKGROUND

Additive manufacturing machines produce 3D objects by building up layers of material. Some additive manufacturing machines are commonly referred to as "3D printers." 3D printers and other additive manufacturing machines make it possible to convert a CAD (computer aided design) model or other digital representation of an object into the physical object. The model data may be processed into slices defining that part of a layer or layers of build material to be formed into the object.

DRAWINGS

FIGS. 1 and 2 are elevation and plan views, respectively, illustrating an example of a fusing system for an additive manufacturing machine.

FIGS. 3-20 present a sequence of views showing an example of a fusing cycle using the fusing system of FIGS. 1 and 2.

FIG. 26 is a block diagram illustrating an example of a processor readable medium with fuser heat output control instructions.

FIG. 27 is a block diagram illustrating an example of a fusing system for an additive manufacturing implementing a controller with fuser heat control instructions.

FIG. 30 is a block diagram illustrating an example of a processor readable medium with thermal control instructions that include fuser heat output control instructions and warmer heat output control instructions.

FIG. 31 is a block diagram illustrating an example of a fusing system for an additive manufacturing implementing a controller with thermal control instructions that include fuser heat output control instructions and warmer heat output control instructions.

The same part numbers designate the same or similar parts throughout the figures. The figures are not necessarily to scale.

DESCRIPTION

In some additive manufacturing processes, heat is used to sinter, melt or otherwise fuse together the particles in a powdered build material to form a solid object. Heat to fuse the build material may be generated by applying a liquid fusing agent to a thin layer of powdered build material in a pattern based on the corresponding object slice and then irradiating the patterned area with a fusing lamp. Light absorbing components in the fusing agent absorb light energy from the fusing lamp. Radiant heat output by the fusing lamp together with heat generated internally by the light absorbing components in the fusing agent fuses the build material. The process is repeated layer by layer and slice by slice to complete the object.

The heat output of a fusing lamp may diminish with use, for example due to age and contamination. Inadequate heating can adversely affect the quality of a manufactured object. A new fusing system has been developed to help maintain the heat output of a fusing lamp at a desired level for consistent fusing and better object quality. In one example, a fusing system includes a heat sensor to measure the heat output of the fusing lamp and a controller operatively connected to the fusing lamp and to the heat sensor to adjust the heat output of the fusing lamp to the work area based on heat output measured by the heat sensor. The adjustment to heat output may be made, for example, by changing the electrical power to the fusing lamp or by changing the scan speed of the fusing lamp over the work area, or a combination of change to power and scan speed. In other examples, adjustable masks or electronically controlled tinting could be used to adjust the heat output of the fusing lamps to the work area.

These and other examples described below and shown in the figures illustrate but do not limit the scope of the patent, which is defined in the Claims following this Description.

As used in this document: "and/or" means one or more of the connected things; a "fusing agent" means a substance that causes or helps cause a build material to sinter, melt or otherwise fuse; a "detailing agent" means a substance that inhibits or prevents or enhances fusing a build material, for example by modifying the effect of a fusing agent; "light" means electromagnetic radiation of any wavelength; a "liquid" means a fluid not composed primarily of a gas or gases; a "processor readable medium" means any non-transitory tangible medium that can embody, contain, store, or maintain instructions and other information for use by a processor and may include, for example, circuits, integrated circuits, ASICs (application specific integrated circuits), hard drives, random access memory (RAM), read-only memory (ROM), and flash memory; and "work area" means any suitable structure to support or contain build material for fusing, including underlying layers of build material and in-process slice and other object structures.

Figure 1:
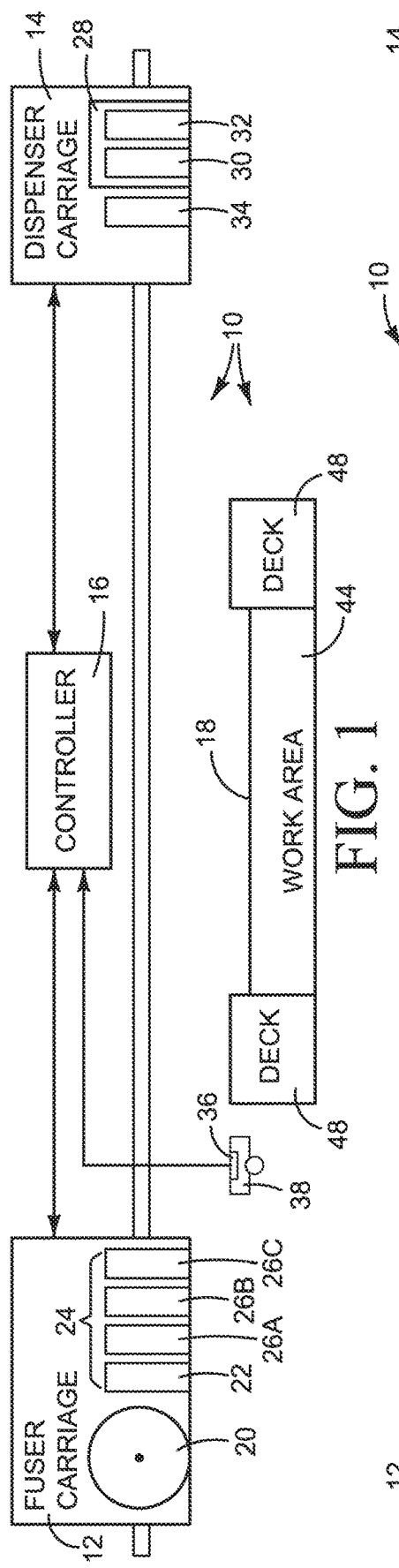
Figure 2:
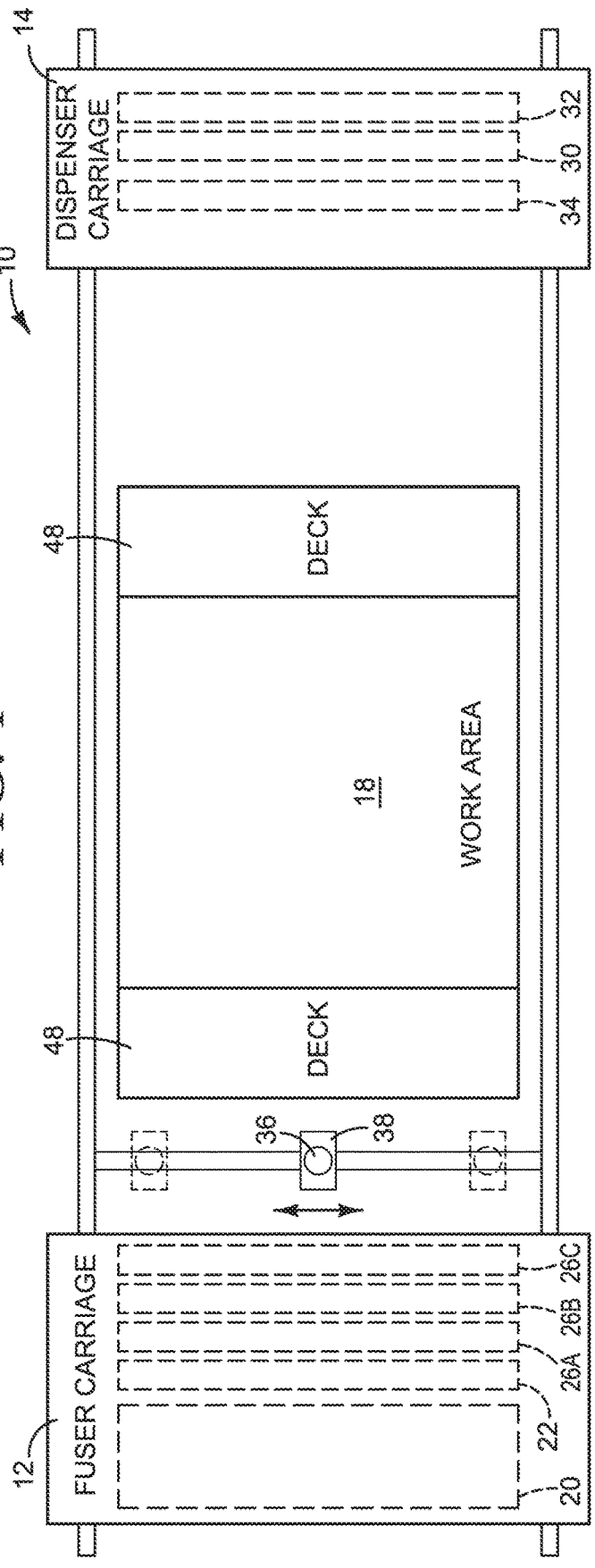

FIGS. 1 and 2 are elevation and plan views, respectively, illustrating one example of a fusing system 10 for an additive manufacturing machine. FIGS. 3-20 present a sequence of views showing an example fusing process using system 10. Referring to FIGS. 1 and 2, fusing system 10 includes a first, "fuser" carriage 12 and a second, "dispenser" carriage 14. Carriages 12 and 14 move back and forth over a work area 18 at the direction of a controller 16. Controller 16 represents the processing and memory resources and the instructions, electronic circuitry and components needed to control the operative elements of system 10.

In this example, fuser carriage 12 carries a layering device 20, a warmer 22, and a group 24 of three fusing lamps 26A, 26B, 26C. Dispenser carriage 14 carries an inkjet printhead assembly or other suitable liquid dispensing assembly 28 to dispense a liquid fusing agent. In the example shown, dispensing assembly 28 includes a first dispenser 30 to dispense a fusing agent and a second dispenser 32 to dispense a detailing agent. Dispenser carriage 14 also carries a temperature sensor 34 to measure the temperature of build material in work area 18. While it is expected that temperature sensor 34 usually will be implemented as a thermal imaging device, such as an infrared camera, other suitable temperature sensors may be used.

Fusing system 10 also includes a heat sensor 36 to measure the heat output of fusing lamps 26A, 26B, 26C directly. In this example, heat sensor 36 is mounted on a carriage 38 that moves back and forth below fusing carriage 12 to position sensor 36 at multiple sensing locations, indicated by dashed lines in FIG. 2. Heat sensor 36 may be implemented, for example, as a thermopile or other heat sensor that measures radiant heat flux directly.

In the example shown in FIGS. 1 and 2, layering device 20 is implemented as a roller 20 that moves between a deployed position (shown in FIG. 5) to layer build material as carriage 12 moves over work area 18 and a retracted position (shown in FIG. 1) to not layer build material as carriage 12 moves over work area 18. Layering roller 20 may rotate freely as it is moved over work area 18, freewheeling clockwise or counter-clockwise depending on the direction of travel, or roller 20 may be driven rotationally in either direction (co-rotated or counter-rotated). Other suitable implementations for a layering device 20 are possible including, for example, a blade or a device that dispenses build material directly over the work area in a layer.

Warmer 22 may be implemented as a "warming" lamp or other radiant heating device 22. "Warming" in this context refers to the preheating function of warmer 22 to heat unfused build material in work area 18 to a temperature below a fusing temperature of the material. Although a single device 22 is shown, multiple warming lamps or other radiant heating devices 22 could be used. Thus, other suitable implementations for warmer 22 are possible. Although three fusing lamps 26A, 26B, 26C are depicted, more or fewer fusing lamps may be used.

The characteristics of warming lamp 22 and fusing lamps 26A, 26B, 26C may vary depending on characteristics of the build material and fusing agent (and other fusing process parameters). Usually a lower color temperature warming lamp 22 and higher color temperature fusing lamps 26A, 26B, 26C will be desirable to better match the spectral absorption of build material not treated with a fusing agent and build material treated with a fusing agent, respectively, for increased energy transfer from the lamps to the build material. For example, a single warming lamp 22 operating in the range of 800K to 2150K may be used to achieve the desired level of power absorption for effectively preheating an untreated white polyamide powdered build material 40 (FIG. 5), and three fusing lamps 26A, 26B, 26C each operating in the range of 2400K to 3500K may be used to achieve the desired level of power absorption for effectively fusing the same build material treated with a black liquid fusing agent 42 (FIG. 9). A black fusing agent absorbing nearly all of the radiant energy emitted by the higher color temperature fusing lamps fuses the treated build material without also fusing the surrounding untreated build material. Operating at higher color temperatures, however, reduces lamp life. Thus, while an operating color temperature at the upper end of the effective range may be desired for improved fusing, to increase energy absorption into the treated build material and decrease energy absorption into untreated build material, cost constraints may urge actual lamp operating conditions toward the lower end of the range.

As noted above, work area 18 represents any suitable structure to support or contain build material for fusing, including underlying layers of build material and in-process slice and other object structures. For a first layer of build material, for example as shown in FIG. 7, work area 18 may be formed on the surface of a platform 44 that moves up and down to accommodate the layering process. For succeeding layers of build material, for example as shown in FIG. 15, work area 18 may be formed on an underlying object structure which may include unfused and fused build material.

In FIGS. 1 and 2, fuser carriage 12 and dispenser carriage 14 are parked, awaiting the next build cycle. In FIGS. 3 and 4, all four lamps have been energized and allowed time to reach their operating state. Due to the considerable heat output of the lamps, the lamps usually will not be stationary for more than a few second while energized, to avoid overheating the fusing system. Thus, carriage 12 may be scanned back and forth over platform 44 during any warm up period to avoid overheating. After the warm up period, carriage 12 is scanned over heat sensor 36 to measure the heat output of each fusing lamp 26A, 26B, 26C. Sensor 36 may be moved to multiple positions along carriage 38 to measure heat output of each fusing lamp at multiple locations. As described in more detail below with reference to FIGS. 21 and 22, controller 16 uses measurements from heat sensor 36 to determine if an adjustment to the heat output of the fusing lamp to the work area is desired and, if yes, to make the appropriate adjustment.

To more accurately measure the heat output of the fusing lamps to the work area during fusing, a thermopile 36 may be positioned on carriage 38 such that the distance D1 between the heat absorbing surface of the thermopile and the fusing lamp during measuring is substantially equal to the distance D2 between the fusing lamp and build material in the work area during fusing. "Substantially" equal in this context means within ±1 mm.

In FIGS. 5 and 6, a ribbon 46 of build material powder 40 has been deposited along a left side deck 48 adjacent to work area 18. Layering roller 20 is deployed as fuser carriage 12 moves to the right in a first pass, as indicated by motion arrows 50, and warming lamp 22 preheats the powder 40 in supply ribbon 46. Fusing lamps 26A, 26B, 26C may contribute a small amount of heat to untreated powder 40. However, as noted above, in this example the fusing lamps are configured to optimize heating untreated build material, and thus heat untreated build material poorly. In FIGS. 7 and 8, as fuser carriage 12 continues moving to the right in the first pass, the lamps heat build platform 44 (or underlying base layers or object structure in subsequent layers) while roller 20 layers build material 40 in a layer 52 over platform 44.

In FIGS. 9 and 10, as fuser carriage 12 moves to the left in a second pass, indicated by motion arrows 54, layering roller 20 is retracted and warming lamp 22 is on to preheat unfused build material 40 in layer 52. Also in this second pass, dispenser carriage 14 follows fusing carriage 12 over work area 18. Sensor 34 is on to measure the temperature of preheated build material 40 and dispenser 30 dispenses a fusing agent 42 on to the build material in a pattern 58 corresponding to an object slice. As described in more detail below with reference to FIGS. 23 and 24, controller 16 uses measurements by sensor 34 to determine if adjustments to the heat output of warming lamp 22 are desired and, if yes, to make the desired adjustments.

Figure 13:
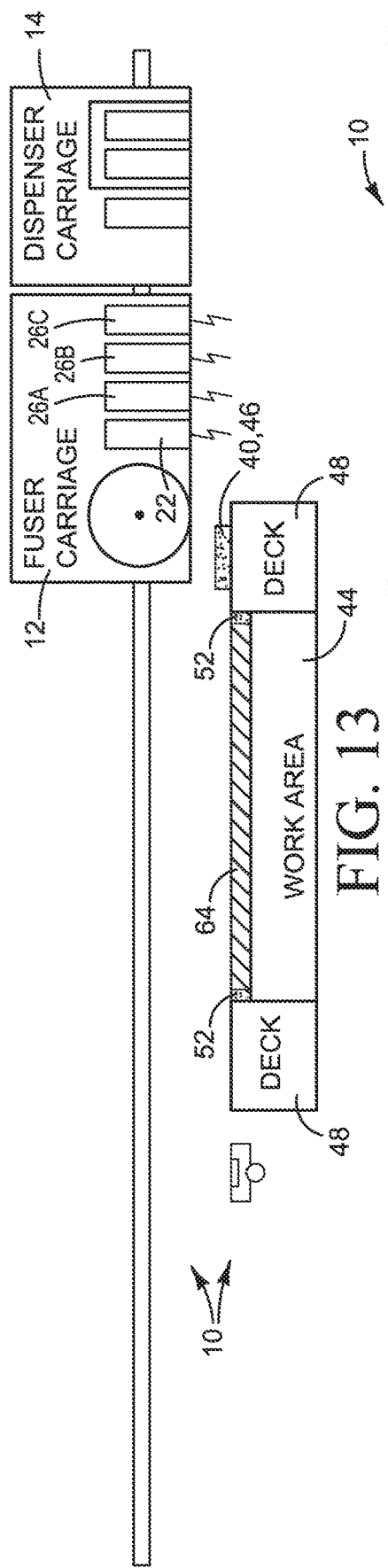
Figure 14:
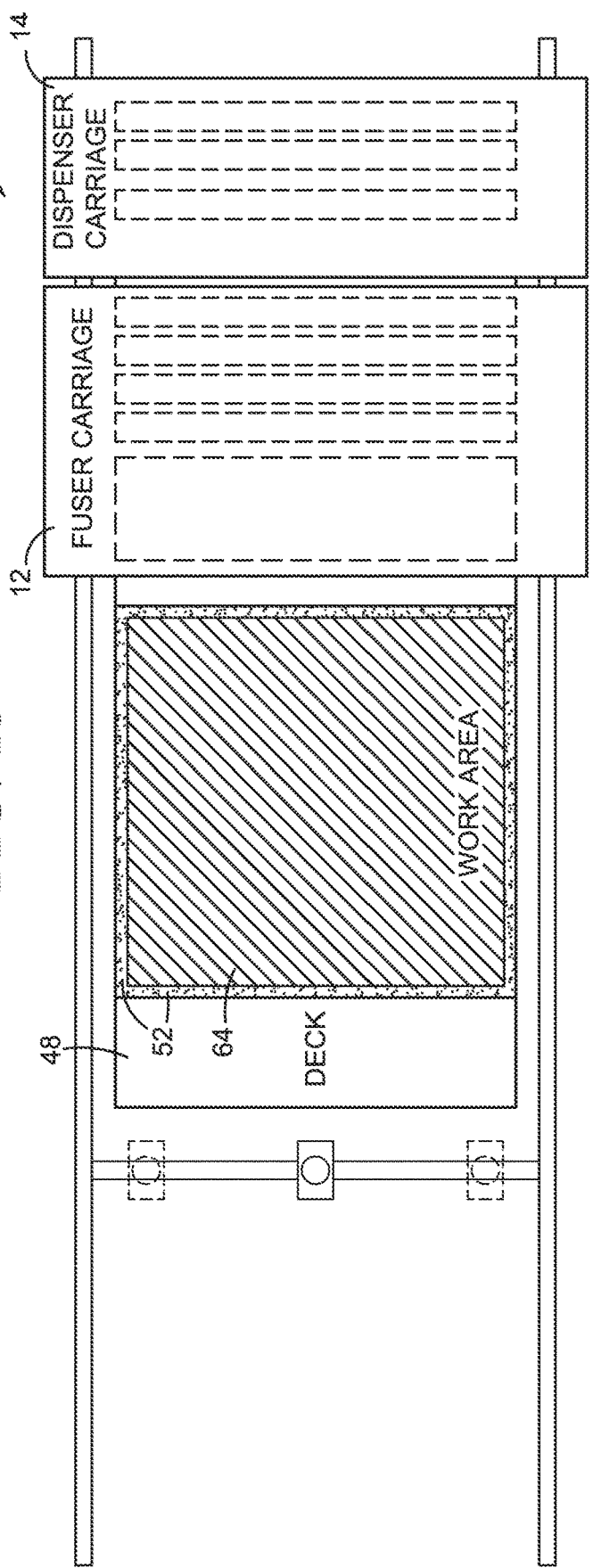

In FIGS. 11 and 12, as dispenser carriage 14 moves to the right in a third pass, indicated by motion arrows 50, dispenser 32 dispenses a detailing agent 62 on to build material 40 in layer 52. Also in this third pass, fusing carriage 12 follows dispenser carriage 14 with fusing lamps 26A, 26B, 26C on to fuse patterned build material into an object slice 64. In FIGS. 13 and 14, fuser carriage 12 and dispenser carriage 14 have reached the right side of work area 18 in preparation for the next layer after forming slice 64 in layer 52.

The sequence of operations is repeated for the next slice, as shown in FIGS. 15-20. In FIGS. 15-16 and 17-18, fuser carriage 12 and dispenser carriage 14 are moving to the left in a first pass, indicated by motion arrows 54. In FIGS. 15 and 16, roller 20 is deployed to layer build material over work area 18 in a next layer 66 and warming lamp 22 is on to preheat build material in layer 66. In FIGS. 17 and 18, as carriages 12 and 14 continue across work area 18, sensor 34 is on to measure the temperature of preheated unfused build material in layer 66 and dispenser 30 dispenses a fusing agent 42 in a pattern 68 corresponding to the next object slice. In FIGS. 19 and 20, as dispenser carriage 14 moves to the right in a second pass, dispenser 32 dispenses a detailing agent 62 on to build material in layer 66. Also in this second pass, fuser carriage 12 follows dispenser carriage 14 over work area 18 with fusing lamps 26A, 26B, 26C on to fuse patterned build material 68 in a second slice 70.

The sequence of operations may continue for each succeeding layer of build material, slice by slice, to complete the object.

FIGS. 1-20 illustrate just one example of a fusing system 10 and fusing sequence. Other suitable fusing systems and sequences are possible. For example, warmer 22 and/or fusing lamps 26A, 26B, 26C may be implemented as stationary devices, rather than as carriage mounted devices. More or fewer fusing lamps could be used. Fusing carriage 12 and dispenser carriage 14 could move along perpendicular paths rather than parallel paths, more or fewer agent dispensers could be used to dispense more or fewer agents, and the sequence of layering, dispensing, and fusing may vary from that shown.

Figure 21:
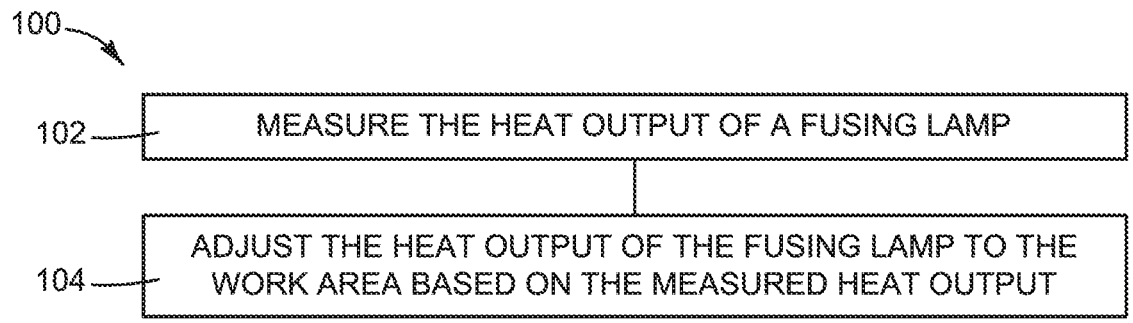
FIGS. 21 and 22 are flow diagrams illustrating example fusing processes in which the heat output of a fusing lamp to the work area is adjusted based on a measure of the heat output of the fusing lamp.

FIG. 21 illustrates one example of a fusing process 100 for additive manufacturing, such as might be implemented with a fusing system 10 shown in FIGS. 1 and 2. Referring to FIG. 21, the heat output of a fusing lamp is measured (block 102) and then the heat output of the fusing lamp to the work area is adjusted based on the measured heat output (block 104). For example, the heat output of the fusing lamp may be adjusted by changing the electrical power supplied to the fusing lamp and/or by changing the speed at which the fusing lamp is scanned over the work area.

Figure 22:
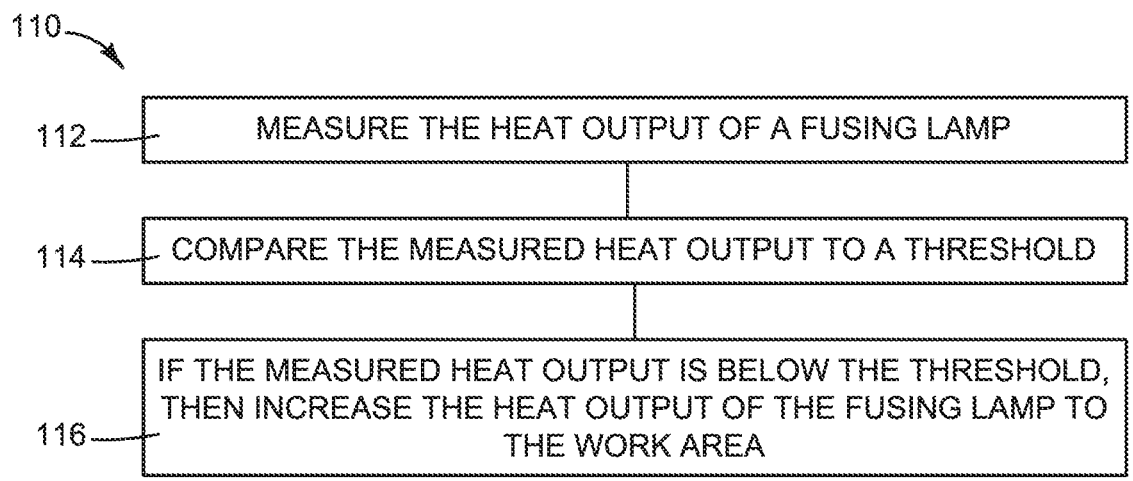

FIG. 22 illustrates another example of a fusing process 110 for additive manufacturing, such as might be implemented with a fusing system 10 shown in FIGS. 1 and 2. Referring to FIG. 22, the heat output of a fusing lamp is measured (block 112) and the measured output compared to a threshold heat output for the lamp (block 114). If the measured heat output is below the threshold, then the heat output of the fusing lamp to the work area is increased (block 116), for example by increasing the electrical power to the lamp or by slowing the speed at which the lamp is scanned over the work area. While a diminished heat output is more likely, and more likely to be of interest, the process may also include decreasing the heat output of a fusing lamp if the measured output is above a threshold.

Electrical power to the fusing lamp may be changed by modulating the pulse width of the power supply signal. The relationship between pulse width (or another power control parameter) and heat output for a fusing lamp may be established from the technical specifications for the lamp or empirically based on operation of the lamp in the fusing system. The heat output of the fusing lamps may be adjusted before or after a build cycle or during a build cycle.

While any useful threshold for heat output may be used, it is expected that a threshold at or near the heat output of a new lamp will be desirable for many additive manufacturing applications to maintain consistent performance in systems that use the same type of fusing lamps. Similarly, although any suitable heat sensor may be used to measure the heat output of a fusing lamp, a thermopile or other heat sensor that measures radiant heat flux directly will be desirable for many additive manufacturing applications to help reduce complexity and promote accuracy in the adjustment process.

Figure 23:
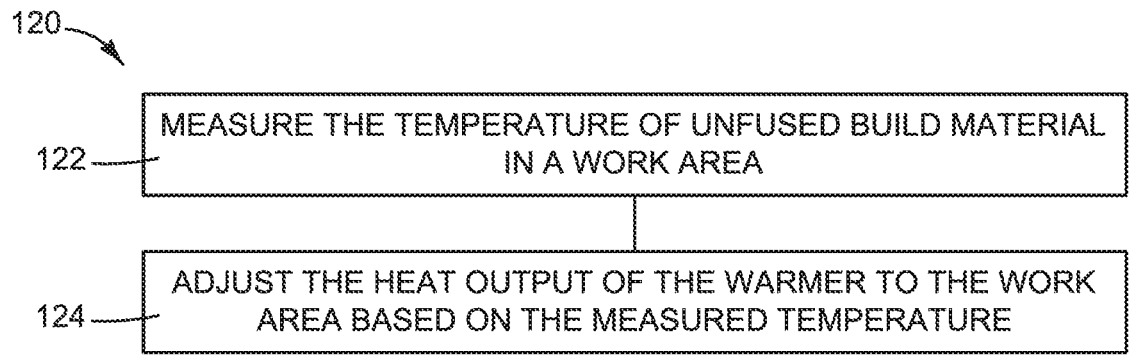
FIGS. 23 and 24 are flow diagrams illustrating example fusing processes in which the heat output of a warmer to the work area is adjusted based on a measure of the temperature of unfused build material in the work area.

FIG. 23 illustrates one example of a fusing process 120 for additive manufacturing, such as might be implemented with a fusing system 10 shown in FIGS. 1 and 2. Referring to FIG. 23, the temperature of unfused build material in a layer of build material in a work area is measured (block 122) and then the heat output of the warmer to the work area is adjusted based on the measured temperature (block 124). For example, the heat output of the warmer may be adjusted by changing the electrical power supplied to the warmer and/or by changing the speed at which the warmer is scanned over the work area.

Figure 24:
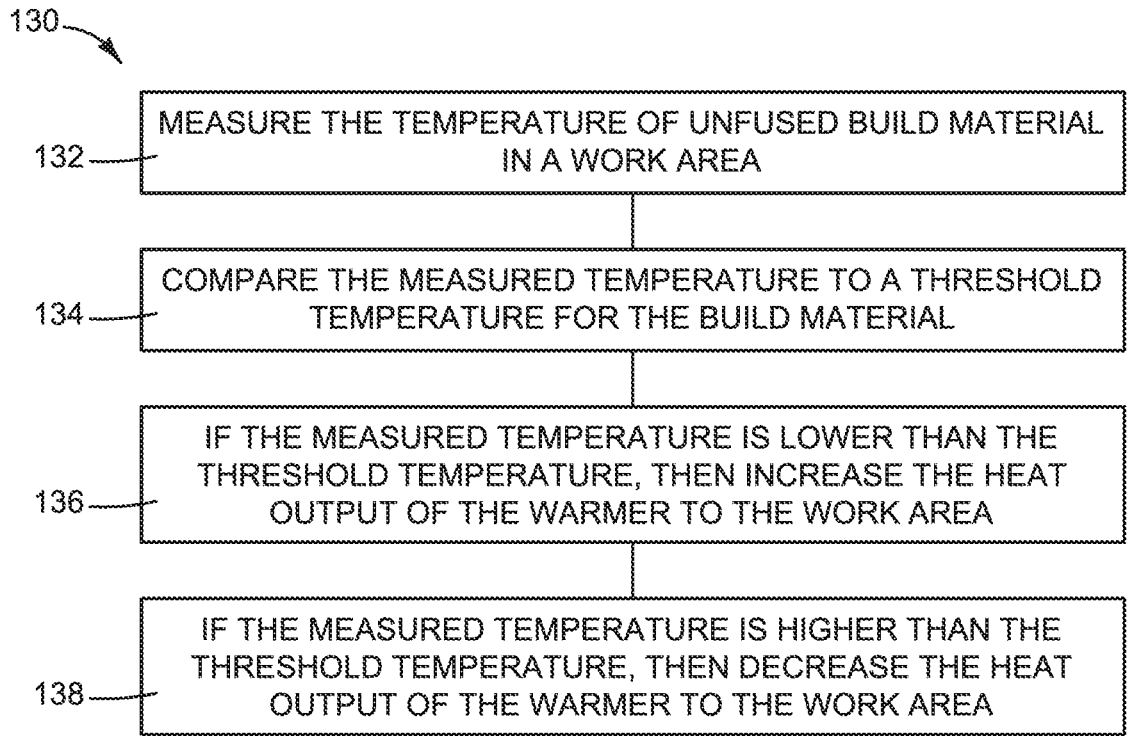

FIG. 24 illustrates another example of a fusing process 130 for additive manufacturing, such as might be implemented with a fusing system 10 shown in FIGS. 1 and 2. Referring to FIG. 24, the temperature of unfused build material in a layer of build material in a work area is measured (block 132) and the measured temperature compared to a threshold temperature for the build material (block 134). If the measured temperature is lower than the threshold temperature, then the heat output of the warmer to the work area is increased (block 136), for example by increasing electrical power to the warmer or by reducing the speed at which the warmer is scanned over the work area. If the measured temperature is higher than the threshold temperature, then the heat output of the warmer to the work area is decreased (block 138), for example by decreasing electrical power to the warmer or by increasing the speed at which the warmer is scanned over the work area.

While any useful threshold for temperature may be used, it is expected that the threshold will include a maximum temperature threshold and a minimum temperature threshold defining the desired range of preheating temperatures for unfused build material. Similarly, although any suitable temperature sensor may be used to measure the temperature of the unfused build material, a non-contact thermal sensing device such as an infrared camera, a microbolometer, or a thermopile may be desirable for many additive manufacturing applications to enable positioning away from the build material. The temperature sensor may be mounted to a carriage, as shown in FIGS. 1-20, to scan over the work area, or a fixed position temperature sensor may be used.

Figure 25:
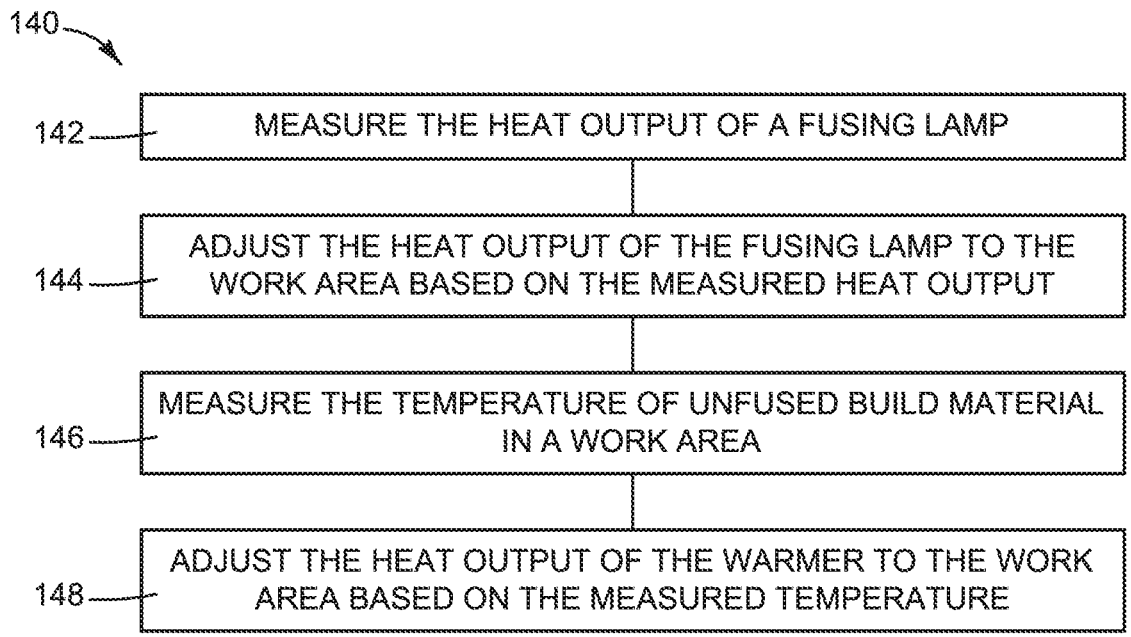
FIG. 25 is a flow diagram illustrating an example of a fusing process in which the heat output of a fusing lamp to the work area is adjusted based on a measure of the heat output of the fusing lamp, and the heat output of a warmer to the work area is adjusted based on a measure of the temperature of unfused build material in the work area.

Fusing lamp and warmer adjustments are combined in a fusing process 140 illustrated in FIG. 25 Referring to FIG. 25, the heat output of a fusing lamp is measured (block 142) and the heat output of the fusing lamp to a work area is adjusted based on the measured heat output (block 144). The temperature of unfused build material in the work area is measured (block 146) and the heat output of the warmer to the work area is adjusted based on the measured temperature (148). In one specific implementation, multiple fusing lamps are adjusted before a build cycle (including after a prior build cycle) while a single warmer is adjusted continuously or repeatedly during the build cycle.

FIGS. 21-25 do not necessarily indicate a specific order of execution. The order of execution of one or more blocks in FIGS. 21-25 may be different from that shown.

FIG. 26 is a block diagram illustrating a processor readable medium 72 with fuser heat control instructions 74 to adjust the heat output of a fusing lamp, or multiple fusing lamps, in a fusing system for additive manufacturing. For example, instructions 74 may include instructions to execute process 100 in FIG. 21 or process 110 in FIG. 22.

FIG. 27 is a block diagram illustrating one example of a fusing system 10 for an additive manufacturing machine, implementing a controller 16 with fuser heat control instructions 74. Referring to FIG. 27, system 10 includes controller 16, a work area 18, a build material layering device 20, a fusing agent dispenser 30, a detailing agent dispenser 32, a warmer 24 and a fusing lamp 26. Controller 16 represents the processing and memory resources and instructions, and the electronic circuitry and components needed to control the operative elements of system 10. In particular, controller 16 includes a processor readable medium 72 with heat control instructions 74 and a processor 76 to read and execute instructions 74.

Figure 28:
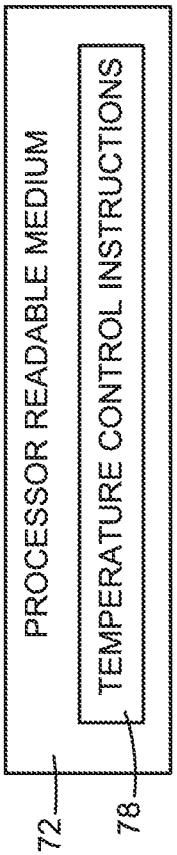
FIG. 28 is a block diagram illustrating an example of a processor readable medium with warmer heat output control instructions.

FIG. 28 is a block diagram illustrating a processor readable medium 72 with temperature control instructions 78 to adjust the heat output of a warmer to help maintain the desired temperature of unfused build material in a fusing process for additive manufacturing. For example, instructions 78 may include instructions to execute process 120 in FIG. 23 or process 130 in FIG. 24.

Figure 29:
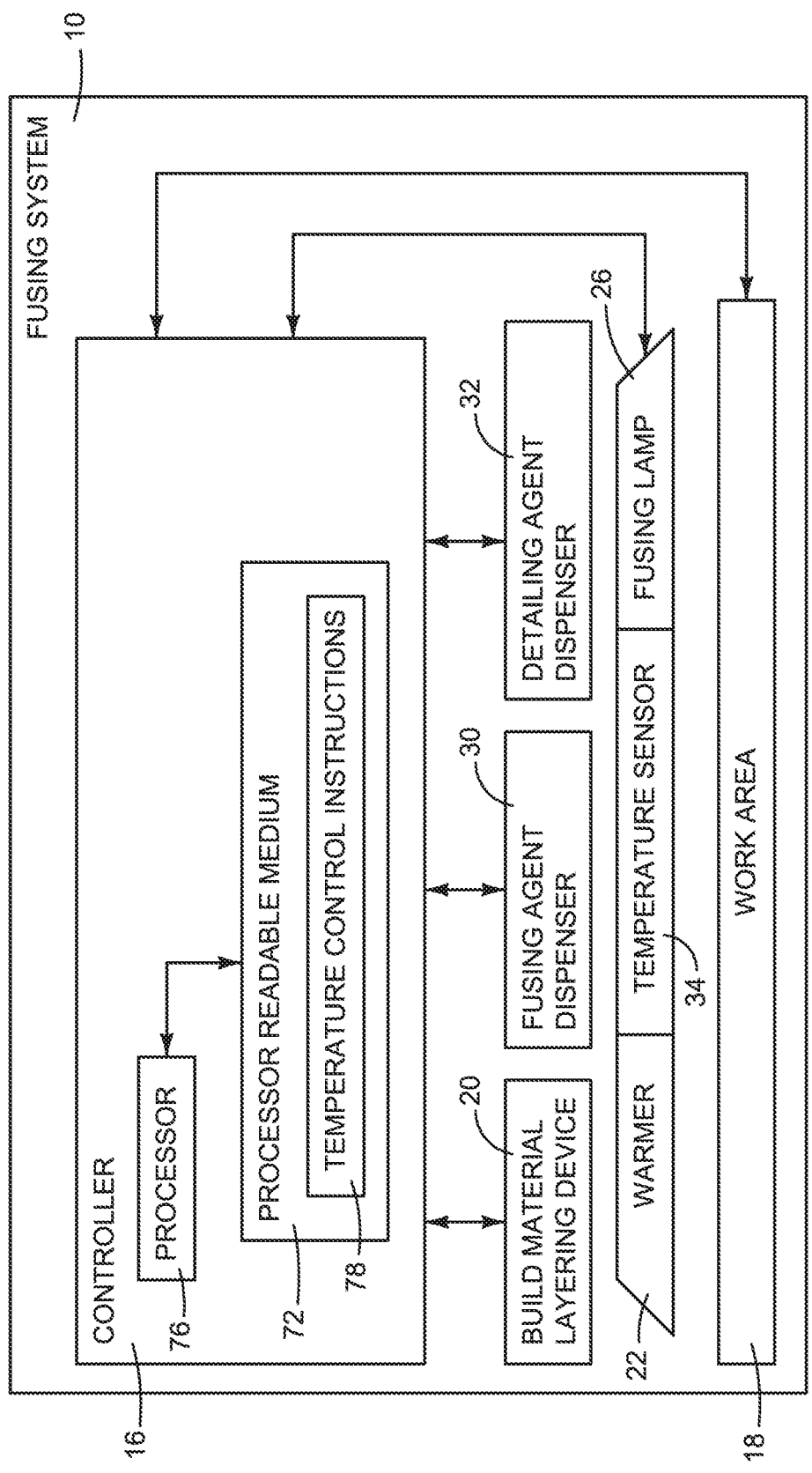
FIG. 29 is a block diagram illustrating an example of a fusing system for an additive manufacturing implementing a controller with warmer heat control instructions.

FIG. 29 is a block diagram illustrating one example of a fusing system 10 for an additive manufacturing machine, implementing a controller 16 with temperature control instructions 78. Referring to FIG. 29, system 10 includes controller 16, a work area 18, a build material layering device 20, a fusing agent dispenser 30, a detailing agent dispenser 32, a warmer 24 and a fusing lamp 26. Controller 16 represents the processing and memory resources and instructions, and the electronic circuitry and components needed to control the operative elements of system 10. In particular, controller 16 includes a processor readable medium 72 with temperature control instructions 78 and a processor 76 to read and execute instructions 78.

FIG. 30 is a block diagram illustrating a processor readable medium 72 with thermal control instructions 80, including heat control instructions 74 to adjust the heat output of a fusing lamp and temperature control instructions 78 to adjust the heat output of a warmer in a fusing process for additive manufacturing. For example, instructions 80 may include instructions to execute process 140 in FIG. 25.

FIG. 31 is a block diagram illustrating one example of a fusing system 10 for an additive manufacturing machine, implementing a controller 16 with thermal control instructions 80. Referring to FIG. 31, system 10 includes controller 16, a work area 18, a build material layering device 20, a fusing agent dispenser 30, a detailing agent dispenser 32, a warmer 24 and a fusing lamp 26. Controller 16 represents the processing and memory resources and instructions, and the electronic circuitry and components needed to control the operative elements of system 10. In particular, controller 16 includes a processor readable medium 72 with thermal control instructions 80 and a processor 76 to read and execute instructions 80.

The examples shown in the figures and described above illustrate but do not limit the patent, which is defined in the following Claims.

"A", "an" and "the" used in the claims means at least one. For example, "a fusing lamp" means one or more fusing lamps and subsequent reference to "the fusing lamp" means the one or more fusing lamps.

The invention claimed is:

1. A fusing system for an additive manufacturing machine, comprising:
    a fusing lamp to heat build material in a work area;
    a heat sensor to measure a heat output of the fusing lamp to the work area directly;
    a first carriage carrying the fusing lamp, the first carriage movable over the work area in a first direction; and
    a second carriage carrying the heat sensor, the second carriage movable in a second direction orthogonal to the first direction to position the heat sensor at multiple different locations along the fusing lamp; and
    a controller operatively connected to the fusing lamp and to the heat sensor and programmed to adjust the heat output of the fusing lamp to the work area based on a heat output measured by the heat sensor.

2. The fusing system of claim 1, where the controller programmed to adjust the heat output of the fusing lamp to the work area comprises the controller programmed to change a scan speed of the first carriage carrying the fusing lamp over the work area.

3. The fusing system of claim 1, where the controller is programmed to adjust the heat output of the fusing lamp based on a comparison of a heat output measured by the heat sensor to a threshold heat output.

4. The fusing system of claim 1, where the controller programmed to adjust the heat output of the fusing lamp to the work area comprises the controller programmed to change electrical power to the fusing lamp.

5. The fusing system of claim 1, comprising:
    a thermal imaging device to measure a temperature of unfused build material in the work area; and
    a warmer to heat unfused build material in the work area; and
    the controller is operatively connected to the warmer and the thermal imaging device and programmed to adjust a heat output of the warmer based on a temperature measured by the thermal imaging device.

6. The fusing system of claim 5, where:
    the heat sensor comprises a thermopile; and
    the thermal imaging device comprises an infrared camera.

7. The fusing system of claim 1, where the fusing lamp comprises multiple fusing lamps and the first carriage movable to position each fusing lamp over the heat sensor to measure an individual heat output of the respective fusing lamp.

8. The fusing system of claim 1, where the heat sensor is positioned a distance from the fusing lamp substantially equal to a distance between the fusing lamp and the build material in the work area during fusing.

9. A fusing system for an additive manufacturing machine, comprising:
    a first carriage movable over a work area, the first carriage carrying a warmer to heat unfused layered build material and a fusing lamp to heat layered build material patterned with a fusing agent;
    a second carriage movable over the work area, the second carriage carrying a dispenser to dispense the fusing agent on to layered build material in a pattern corresponding to an object slice; and
    a third carriage carrying a heat sensor to measure a heat output of the fusing lamp to the work area directly, the third carriage movable to position the heat sensor at multiple different locations along the fusing lamp;

a temperature sensor to measure a temperature of unfused build material in the work area; and a controller operatively connected to the warming lamp, the fusing lamp, the thermal imaging device, and the temperature sensor, the controller programmed to:
adjust the heat output of the warmer based on a heat output measured by the temperature sensor; and
adjust the heat output of the fusing lamp based on a heat output measured by the heat sensor.

10. The fusing system of claim 9, where the fusing lamp comprises multiple fusing lamps and the first carriage is movable to position each fusing lamp over the heat sensor to measure an individual heat output of the respective fusing lamp.

11. The fusing system of claim 9, where the heat sensor is positioned a distance from the fusing lamp substantially equal to a distance between the fusing lamp and the build material in the work area during fusing.

* * * * *